(12) United States Patent
Zettergren

(10) Patent No.: US 9,784,359 B2
(45) Date of Patent: Oct. 10, 2017

(54) MULTI-RATIO GEARBOX HOUSING

(75) Inventor: Lars Zettergren, Myggenäs (SE)

(73) Assignee: Volvo Lastvagnar AB, Göteborg (SE)

( * ) Notice: Subject to any disclaimer, the term of this patent is extended or adjusted under 35 U.S.C. 154(b) by 331 days.

(21) Appl. No.: 14/235,694

(22) PCT Filed: Aug. 15, 2011

(86) PCT No.: PCT/EP2011/004090
§ 371 (c)(1),
(2), (4) Date: Jan. 28, 2014

(87) PCT Pub. No.: WO2013/023668
PCT Pub. Date: Feb. 21, 2013

(65) Prior Publication Data
US 2014/0157954 A1 Jun. 12, 2014

(51) Int. Cl.
*F16H 57/021* (2012.01)
*B22D 19/02* (2006.01)
(Continued)

(52) U.S. Cl.
CPC ........... *F16H 57/021* (2013.01); *B22D 19/02* (2013.01); *F16H 57/032* (2013.01); *F16H 2057/0206* (2013.01); *Y10T 74/2186* (2015.01)

(58) Field of Classification Search
CPC .... F03D 15/00; F16H 57/021; F16H 57/0206; F16H 57/022; F16C 21/104; F16C 29/00
(Continued)

(56) References Cited

U.S. PATENT DOCUMENTS 3,745,854 A * 7/1973 Haag ..................... F01C 21/104
164/98
4,809,333 A 2/1989 Taylor
(Continued)

FOREIGN PATENT DOCUMENTS

DE 3140330 A1 * 4/1983
GB 862662 * 3/1961
(Continued)

OTHER PUBLICATIONS

EPO Machine Translation of DE 3140330 A1, Naumann, Apr. 1983.*
(Continued)

*Primary Examiner* — Vinh Luong
(74) *Attorney, Agent, or Firm* — WRB-IP LLP

(57) ABSTRACT

A multi-ratio gearbox housing for a vehicle is made of light metal material and includes a first bearing seat having a cylindrical inner surface, and a reinforcement member having a first cylindrical inner surface surrounding the first bearing seat for reducing thermal radial expansion of the first bearing seat, the reinforcement member being of a material the coefficient of thermal expansion of which is less than the coefficient of thermal expansion of the light metal material of the housing. The reinforcing member is a cast-in insert arranged in the housing, and a radial distance between the first cylindrical inner surface and the cylindrical inner surface of the first bearing seat is substantially constant along circumferential lines of the first bearing seat, facilitating improved form stability of the cylindrical inner surface of the first bearing seat over the temperature operating range of the housing.

13 Claims, 3 Drawing Sheets

(51) Int. Cl.
*F16H 57/032* (2012.01)
*F16H 57/02* (2012.01)

(58) Field of Classification Search
USPC .......................................................... 74/606 R
See application file for complete search history.

(56) References Cited

U.S. PATENT DOCUMENTS

| | | | | |
|---|---|---|---|---|
| 5,356,276 A | * | 10/1994 | Spinnler | F01C 21/104 418/179 |
| 5,713,247 A | * | 2/1998 | Skelton | B60K 17/16 74/606 R |
| 6,189,413 B1 | * | 2/2001 | Morse | B22D 19/00 74/607 |
| 7,377,598 B2 | * | 5/2008 | Doud | B60B 35/003 180/378 |
| 2009/0100966 A1 | * | 4/2009 | Hedman | F16H 57/022 74/606 R |
| 2013/0239389 A1 | * | 9/2013 | Liu | B23P 15/00 29/428 |

FOREIGN PATENT DOCUMENTS

| | | | |
|---|---|---|---|
| GB | 2513608 A | * | 5/2014 |
| JP | H0783312 A | * | 3/1995 |
| JP | 2003184566 A | | 7/2003 |
| JP | 2009079466 A | | 4/2009 |
| JP | 2010038206 A | | 2/2010 |
| JP | 2011127643 A | | 6/2011 |
| WO | 0103868 A1 | | 1/2001 |

OTHER PUBLICATIONS

Define bearing seat—Google Search, Feb. 18, 2017.*
Define ferrous—Google Search, Feb. 18, 2017, Mar. 1961.*
Define steel—Google Search, Feb. 18, 2017.*
Abstract of GB 862,662, Ballard.*
International Search Report ((Mar. 23, 2012) for corresponding International Application PCT/EP2011/004090.

* cited by examiner

MULTI-RATIO GEARBOX HOUSING

BACKGROUND AND SUMMARY

The present invention relates to multi-ratio gearbox housing for a vehicle, wherein said housing being made of light metal material. The housing comprises a first bearing seat having a cylindrical inner surface, a reinforcement member having a first cylindrical inner surface surrounding the first bearing seat for reducing thermal radial expansion of the first bearing seat. The reinforcement member being of a material the coefficient of thermal expansion of which is less than the coefficient of thermal expansion of said light metal material of said housing.

Fix-axes gear transmissions are used in many fields of technology, for instance in vehicles in manually shifted or automated form. They comprise a number of gearwheels that are located on a number of shafts. The shafts are supported by bearings that are seated in bearing seats of the transmission housing. The rotational axes of the shafts are thereby substantially fixed, hence the designation fix-axes gear transmissions. Modern heavy duty truck engines with increasing power output levels result in increased heat generation within the gearbox due to friction losses. It is desirable to push the upper temperature operation limit of the gearbox further to allow a broader operation range, facilitating handling of increased power output without further expensive and complex cooling arrangements. However, when increasing the allowable gearbox operation temperature, increasing problems with rotating outer bearing rings are indentified. This problem occurs mainly due to the different level of thermal expansion of the housing and the outer bearing ring. The housing is normally made of a light metal material having a first coefficient of thermal expansion, and the bearing outer ring is normally press-fitted within the bearing seat and made of steel having a second coefficient of thermal expansion, which is lower than said first coefficient of thermal expansion. The diameter of the bearing seat in said housing thus tends to expand more than the diameter of the outer bearing ring, such that the press-fit of the outer bearing ring decreases, and even completely disappears. As a result, the outer bearing ring may rotate within its bearing seat, leading to abnormal wear of the housing and increased vibrations and friction losses.

One known solution for preventing rotation of outer bearing rings is to secure them to the gearbox housing by means of axial pins that are inserted after mounting of the bearings. These pins thus mechanically lock the outer bearing ring with the housing. This solution however requires additional components, additional assembly steps, and reduced reliability as the pins may break or get loose within the gearbox.

In another solution, as shown in U.S. Pat. No. 4,809,833, a cylindrical clamping ring is seated on cylindrical outer surface of the bearing housing, for the purpose of limiting the widening of the bearing seat upon increased working temperature. This solution is however limited to certain specific housing designs having said cylindrical outer surface of the bearing housing.

There is thus a need for an improved multi-ratio gearbox housing, which at least partly removes the above mentioned disadvantages.

It is desirable to provide an improved multi-ratio gearbox housing where the previously mentioned problems are partly avoided. According to an aspect of the present invention, a reinforcing member being a cast-in insert arranged in said housing, and in that the radial distance between said first cylindrical inner surface of said reinforcement member and said cylindrical inner surface of said first bearing seat is substantially constant along circumferential lines of said first bearing seat, thereby facilitating improved form stability of said cylindrical inner surface of said first bearing seat over the temperature operating range of the housing.

According to another aspect of the invention, a method of manufacturing a multi-ratio gearbox housing is provided, which comprises the steps of providing a casting mould for said housing that comprises a first bearing seat having a cylindrical inner surface, arranging at least one reinforcement member within said mould, such that a first cylindrical inner surface of said reinforcement member surrounds said first bearing seat for reducing thermal radial expansion of said first bearing seat in the finished product, casting light metal material into said mould, wherein said reinforcement member being of a material the coefficient of thermal expansion of which is less than the coefficient of thermal expansion of said light metal material of said housing, and wherein the radial distance between said first cylindrical inner surface of said reinforcement member and said cylindrical inner surface of said first bearing seat is constant along circumferential lines of said first bearing seat, facilitating improved form stability of said cylindrical inner surface of said first bearing seat over the temperature operating range of the housing.

The inventive solution is based on the fact that the reinforcement member does not expand as much as the light metal material of the housing due to the difference in coefficients of thermal expansion, thereby holding, and preventing the light metal material of the bearing seat from expanding outwards. Instead, the light metal material inside of the reinforcement member may even expand inwards, thereby maintaining bearing seat diameter intact over a wide thermal operating range of the gearbox housing, thus preventing the bearing outer ring from rotating.

Further advantages are achieved by implementing one or several of the features of the dependent claims.

BRIEF DESCRIPTION OF THE DRAWINGS

The present invention will now be described in detail with reference to the figures, wherein.

DETAILED DESCRIPTION

Various aspects of the invention will hereinafter be described in conjunction with the appended drawings provided to illustrate and not to limit the invention, wherein like designations denote like elements, and variations of the aspects are not restricted to the specific shown aspect, but are applicable on other variations of the invention.

Figure 1:
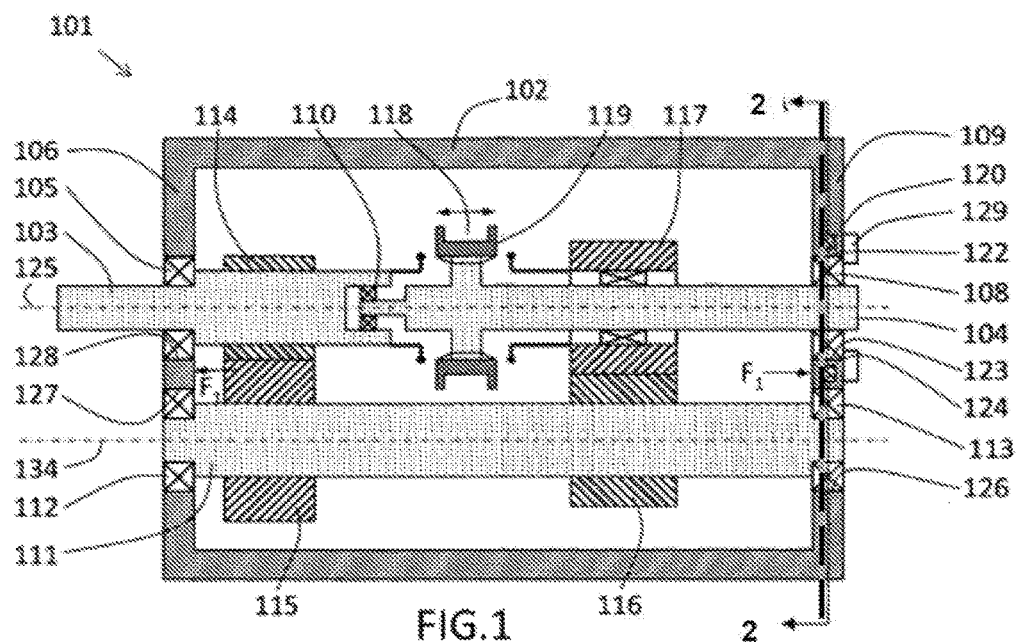
FIG. 1 shows a longitudinal section of a multi-ratio gearbox according to a first embodiment of the invention.

FIG. 1 shows a simplified longitudinal section of a fix-axes multi-ratio gearbox 101 with a housing 102, input shaft 103, and output shall 104. The gearbox housing 102 is here shown as a one-piece unit, but it could also have been composed of two or more housing parts. The input shaft 103 is supported by an input shaft bearing 105, which is seated in a second wall 106 of the gearbox housing 102, and by a flywheel pilot bearing seated in a prime mover output shaft not shown). Similarly, the output shaft 104 is supported by an output shaft bearing 108 that is seated in a first wall 109 of the gearbox housing 102. The input shaft 103 is substantially coaxial with the output shaft 104 along a first axis 125, which extend substantially perpendicular to the first and second walls 109, 106. A second point of support for the output shall 104 is a pilot bearing 110 that is carried by the input shaft 103. Furthermore, there is a countershaft 111 located radially apart from the input shaft 103 and the output shaft 104. The countershaft 111 defines a second axis 134, and is supported by a front countershaft bearing 112, which is seated in the second wall 106, and a rear countershaft bearing 113, which is seated in the first wall 109. An input shaft primary gearwheel 114 is fixedly connected to the input shaft 103. The input shaft primary gearwheel 114 is in mesh with a countershaft primary gearwheel 115 that is fixedly connected to the countershaft 111. A countershaft secondary gearwheel 116 is also fixedly connected to the countershaft 111. The countershaft secondary gearwheel 116 is in mesh with a loose gearwheel 117 that is rotationally supported on the output shaft 104. A tooth clutch 118 can rotationally connect the output shaft 104 to either the loose gearwheel 117 or to the input shaft 103 when an engaging sleeve 119 is moved to the right or to the left, respectively. Thereby, two speed ratios can be obtained. When the loose gearwheel 117 is rotationally connected to the output shaft 104, a reduction gear is obtained where the output shaft 104 rotates slower than the input shaft 103. When the input shaft 101 and the output shaft 104 are rotationally connected, their speeds will be equal and a direct gear is obtained.

When torque is being transferred in the reduction gear, gear mesh forces will occur between the meshing teeth of the gearwheels 114, 115, 116 and 117. In the bearings, these gear mesh forces will cause axial reaction forces Fi that will be carried by the walls of the gearbox housing 102. In particular, the axial reaction forces will tend to deflect the side walls 106, 109 of the housing outwards. In fix-axes gearboxes, taper roller bearings are often used to support the shafts. This type of bearing offers high load capacity and long life to a competitive cost.

The housing 102 may be manufactured by die-casting. The material of the housing 02 is a light metal material, such as aluminium-based light alloy, magnesium-based light alloy, or titanium-based light alloy, for the main purpose of reducing weight of the housing 102. The bearings 105, 112, 113, 108 of the housing walls are however preferably made of steel to provide a wear-resistant, reliable and low cost bearing. The problem with this arrangement is the relatively large difference in coefficient of thermal expansion of the light metal material of the housing and the steel material of the bearing, in particular bearing outer ring. This relatively large difference results in a wide range of press-fit of the bearing within the housing bearing seats during the operation temperature range of the vehicle. The bearing press-fit is not allowed to become to elevated at low temperatures, while still maintaining a press-fit at high temperatures for the purpose of avoiding bearing from getting loose within the bearing seat. Should the press-fit diminish to a sufficient extent, the remaining press-fit will no longer prevent the bearing outer ring from rotating due to the internal rotational friction of the bearing. Bearing outer ring rotation causes severe material wear on primarily the bearing seat of the housing, but also the outer ring itself. Moreover, bearing outer ring rotation leads to vibrations and non-stable shaft positioning, thus resulting in reduced life-time of the overall gearbox.

Hence, the invention aims to provide of a solution for preventing the bearing from getting unfastened within the housing, and in particular preventing the bearing outer ring from rowing within the bearing seat of the housing.

The solution according to a first embodiment of the invention is to arrange a reinforcement member 120 within at least a first wall 109 of the housing 102, as schematically illustrated in FIG. 1. The coefficient of thermal expansion of the reinforcement member 120 is lower than the coefficient of thermal expansion of the material of said first housing wall 109, which means that the housing 102 deforms to larger extent with increased temperature, compared with the reinforcement member 120 that is more thermally form stable. The reinforcement member 120 is a metal cast-in insert. This means that the reinforcement member 120 is arranged within the housing mould before the light metal material fills the mould. Upon filling the mould with said light metal material, the cast-in insert becomes more or less embedded within the first housing wall 109. Preferably, the entire reinforcement member 120 is encapsulated within the material of the first housing wall 109. However, small attachment portions used for fixing the reinforcement member 120 within the housing mould prior and during casting are normally left uncovered.

The first wall 109 of said housing 102 further comprises at least a first bearing seat 123 having a cylindrical inner surface. The reinforcement member 120 comprises a first cylindrical inner surface 124 surrounding said first bearing seat 123 for reducing thermal radial expansion of said first bearing seat 123. Thermal radial expansion is reduced because the reinforcement member 120 will expand less than the housing 102 upon increased operating temperature of the gearbox. Since the reinforcement member 120 is embedded within the material of the housing 102, and arranged a certain distance from the cylindrical surface of the bearing seat 123, an annular portion 122 of the housing light metal material is arranged between said first cylindrical inner surface 124 and said cylindrical inner surface of said first bearing seat 123. Upon increased gearbox operation temperature, this annular portion 122 is thus to a large extent prevented from expanding radially outwards. The material of the annular portion 122 will thus instead partly expand radially inwards towards said cylindrical inner surface of said first bearing seat 123, thereby at least reducing the radial thermal expansion of said first bearing seat 123, possibly providing a thermally form stable first bearing seat 123, or even reducing the diameter of said first bearing seat 23. The first cylindrical inner surface 24 of the reinforcement member 120 completely surrounds said first bearing seat 123 for providing improved distribution of forces within the first wall 109.

The radial distance 130 between said first cylindrical inner surface 124 and said first hearing seat 123 is substantially constant along circumferential lines of said first bearing seat 123, facilitating improved form stability of said first bearing seat 123 over the temperature operating range of the housing 120. Circumferential lines means herein circumferential lines of constant elevation, i.e. circumferential lines in planes perpendicular to said first axis 125 of said first bearing seat 123.

The reinforcement member 120 does not only provide improved thermal form stability of the first bearing seat 123, but also a general reinforcement of the entire first wall 109 of the housing 102, in particular with respect to axial forces Fi that act on the gearbox housing walls 106, 109 in which the bearings 105, 108, 112, 113 are seated. Axial forces Fi result in axial deflection of the housing walls 106, 109, and consequently misalignment of the bearing seats 123, 126. Axial forces Ft are generated by axial gear mesh force components of the helical gearing of the gearwheels 114, 115, 116, 117. The stiffer the housing walls are, the lower that deflection and bearing seat misalignment will be, leading to improved bearing life. With increased bending strength of the reinforcement member 120, as well as increased extension in a plane of said first wall 109, the better axial reinforcement of the first wall 109 is achieved, leading to reduced wall deflection.

In FIG. 1, the reinforcement member 120 is only illustrated within said first wall 109, and only surrounding said first bearing seat 123. The invention is of course equally applicable to all bearing seats of the housing, and the invention is thus not limited to this specific illustration. Separate reinforcement members 120 may thus for example be provided as cast-in inserts around second, third, and fourth bearings seats 126, 127, 128 as well.

Figure 2:
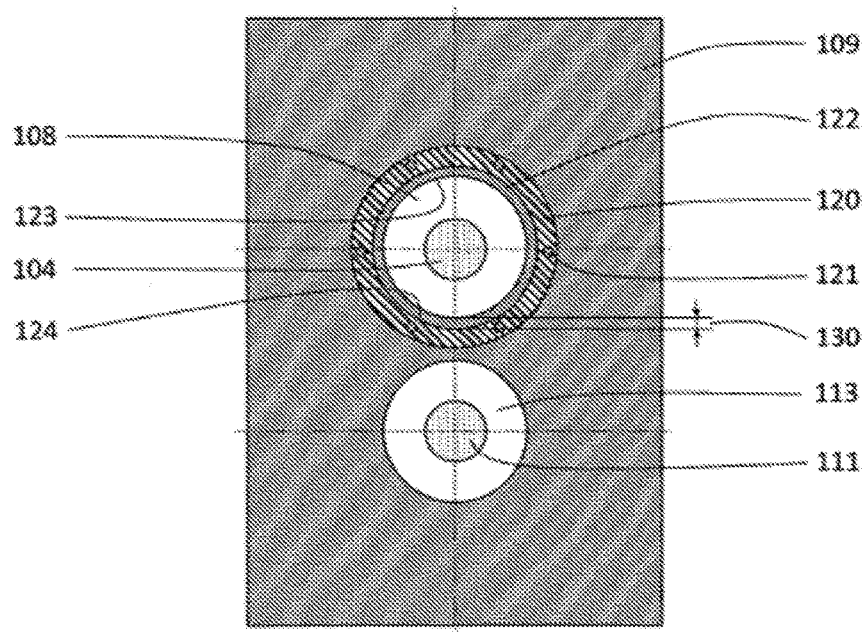
FIG. 2 shows a cross-section of the housing according to the first embodiment of invention.

FIG. 2 shows a cross-section of the housing 120 along line 2-2 in FIG. 1. Here, the first wall 109 is schematically shown as a rectangular block having the output shaft 104 and countershaft 111 rotationally supported therein by means of the output shaft bearing 108 and rear countershaft bearing 113. The output shaft bearing 108 is arranged within the first bearing seat 123. The reinforcement member 120 has a circular shape and is arranged coaxial with the output shaft bearing 108 and output shaft 104. A radial distance 130 between said first cylindrical inner surface of the reinforcement member 120 and the first bearing seat is substantially constant along the circumference of the first bearing seat. The radial distance is normally within the range of 0.5 mm-50 mm, preferably within 1 mm-25 mm, and more preferably within 2 mm-15 mm.

The reinforcement member 120 further comprises a number of axial holes 121 arranged therein. The holes serve at least two purposes: Firstly, the reinforcement member 120 is better secured and bonded within the housing 102 by means of the housing light metal material within the holes 121.

Secondly, they allow an axial bearing retainer 129 to be fastened to the outer surface of the first wall 109 for axially searing the output shaft bearing 108 within the first bearing seat 123. Such a bearing retainer 129 may be embodied as a ring that presses an outer bearing ring of the output shaft bearing 108 axially inwardly, which ring is attached to the outer surface of the first wall 109 by means of fastening means, such as at least one screw that engages a fastening hole of the first wall 109. A fastening hole is thus formed in said first wall 109, as well as in said reinforcement member 120. By arranging the fastening hole of the first wall 109 substantially coaxial with the fastening hole of the reinforcement member 120, and by providing the fastening hole of the reinforcement member 120 with a larger diameter than the diameter of the fastening hole of the first wall 109, a circumferential layer of cast light metal material is provided around the fastening hole of the first wall 109 a radial direction. The at least one fastening hole of the first wall 109 is thus arranged to fit within an axial hole 121 of the reinforcement member 120 for the purpose of avoiding a threaded hole made in two different materials, i.e. housing 102 and reinforcement member 120, and because it is easier to form a threaded hole within the light metal material of the housing 102 than in the steel material of the reinforcement member 120.

Consequently, the reinforcement member 120 does not have to be machined after being cast-in. All machining on the casted housing 102 can be done in the light metal material. As a result, the machining can be optimized for the light metal material only. Moreover, only machining chips of the light metal material will be generated, thereby greatly facilitating the handling and material recycling of the chips.

Figure 3:
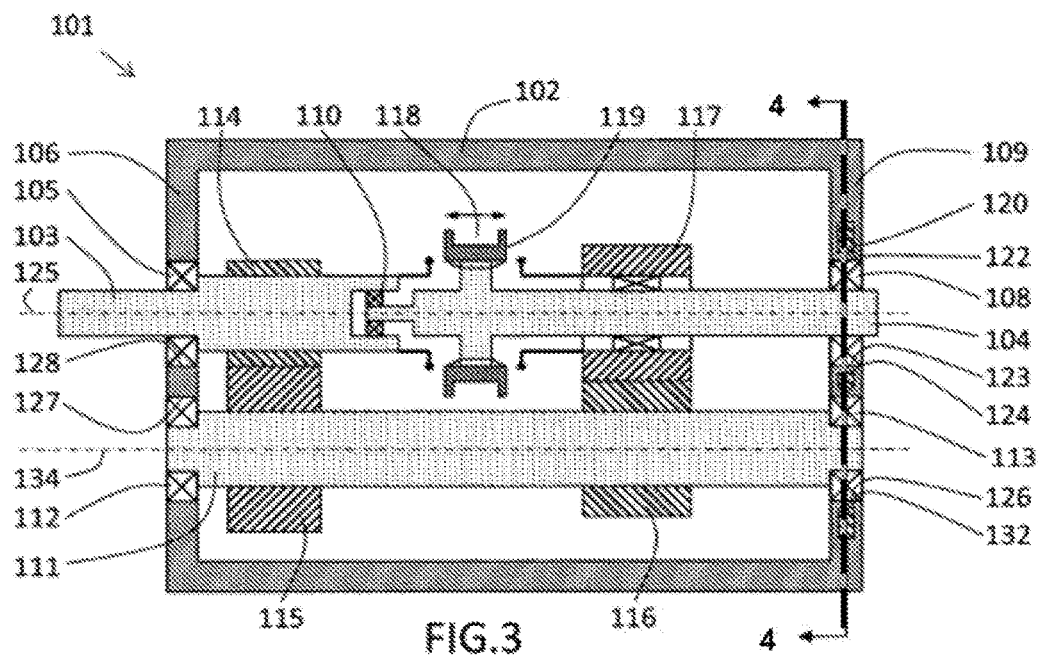
FIG. 3 shows a multi-ratio gearbox housing according to a second embodiment of the invention.
Figure 4:
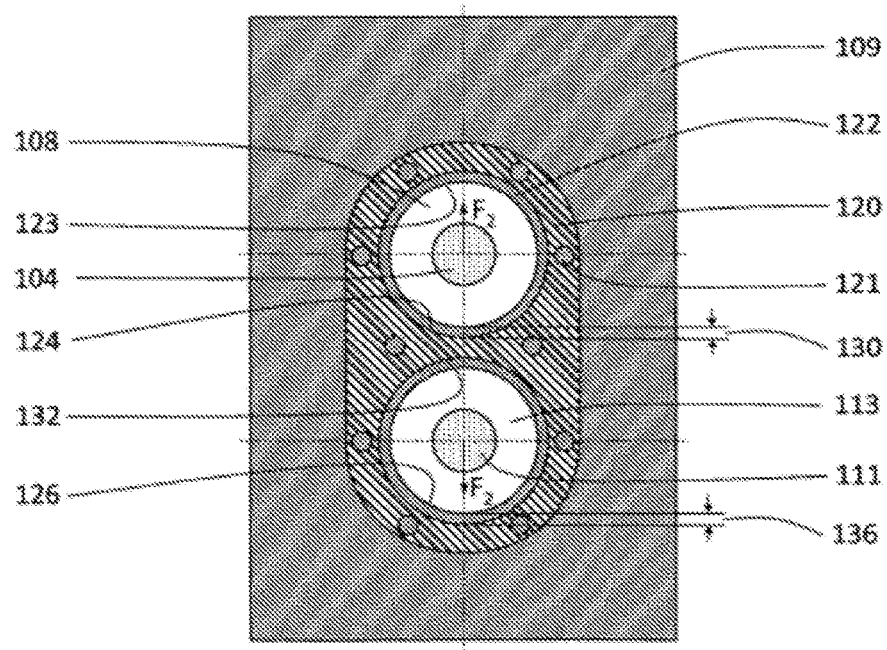
FIG. 4 shows a cross-section of the housing according to the second embodiment of the invention.

FIG. 3 shows a multi-ratio gearbox housing according to a second embodiment of the invention, wherein the reinforcement member 120 having also a second cylindrical inner surface 132 that surrounds the second bearing seat 126 for reducing thermal radial expansion of said second bearing seat 126. FIG. 4 shows a cross-section of the housing 120 along line 4-4 in FIG. 3. The second bearing seat 126 having a cylindrical inner surface. The first axis 125 of the first bearing seat 123 is parallel with a second axis 134 of the second bearing seat 126. The reinforcement member 120 may have many different shapes and the shape shown in FIG. 3 is only illustrative.

The main aspect of the second embodiment is that a single reinforcement member 120 comprises at least two cylindrical inner surfaces 124, 132, each being arranged to surround a unique bearing seat 123, 126. This inventive configuration leads not only to improved thermal form stability of each of the bearing seats 123, 126, but also to improved stability and support of the parallel shafts 104, 111 that are being supported by the bearings 108, 113 in the housing first wall 109. As described above, the reinforcement member 120 provides also a general reinforcement of the first wall 109, in particular in the axial direction. This is even further improved by the second embodiment of the invention because a single reinforcement member 120 here extends over a larger area in the plane of the first wall 109, thus providing even further axial strength against axial deflection of the first wall 109. Here, the first cylindrical inner surface 124 of the reinforcement member 120 completely surrounds said first bearing seat 123 and the second cylindrical inner surface 132 of the reinforcement member 120 completely surrounds said second bearing seat 126 for providing improved distribution of forces within the first wall 109.

Furthermore, the second embodiment of the invention also provides increased strength against forces tending to separate the shafts 104, 111 in a radial direction. Such radial separation forces F2 are generated by the gear mesh of the gearwheels 14, 115, 16, 17. By a single reinforcement member surrounding two shafts 104, 111 that interact by means of gears, radial stability and support of the parallel shafts 104, 111 is improved, resulting in enhanced interrelating dimensional stability of said first and second bearing seats 123, 126. Hence, a strengthened first wall 109 is provided, both in terms of radial and axial forces F2.

A radial distance 130 between the first cylindrical inner surface of the reinforcement member 20 and the first bearing seat is substantially constant along the circumference of the first bearing seat, and a radial distance 136 between the second cylindrical inner surface 132 and said cylindrical inner surface of said second bearing seat 126 is constant along circumferential lines of said second bearing seat 126 for the purpose of facilitating improved form stability of the first and second bearing seats 123, 126 over the temperature operating range of the housing 102. The radial distance 130 associated with the first bearing seat 123 may be identical with the radial distance 136 associated with the second bearing seat 126. These radial distances 130, 136 may however be different, in particular if the diameters of the first and second bearing seats 123, 126 are different.

Figure 6:
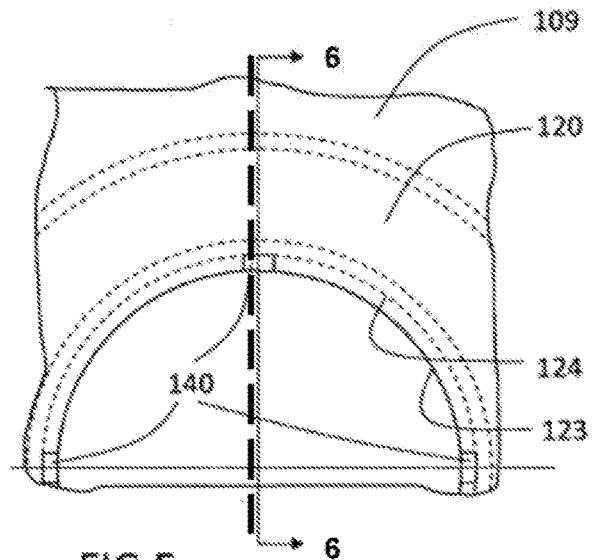
FIG. 6 shows a cross-section of the housing of FIG. 5.
Figure 5:
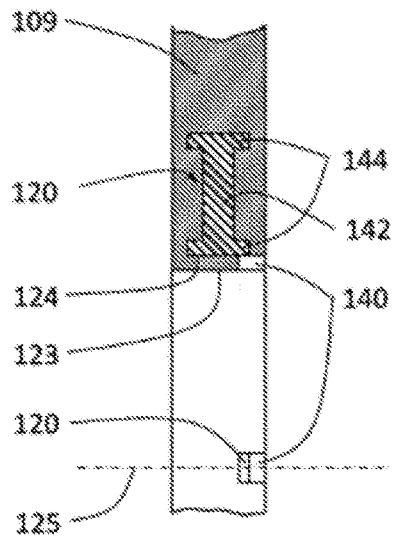
FIG. 5 shows a side view of the housing according to the invention.

FIG. 5 shows a side view of the first wall 109 of the gearbox housing 102 in an axial direction including the first bearing seat 123 according to an aspect of the invention, whereas FIG. 6 shows a cross-section of the first wall 109 along line 6-6 in FIG. 5. Here, the reinforcement member 120 has a circular shape and an l-shaped cross-section, i.e. a shape where a vertical web 142 connects two horizontal flanges 144. This specific shape is only exemplary for illustrating that many different shapes are possible, such as L-shaped, Z-shaped, T-shaped, hollow profile, channel-profile, bar shaped, etc. The cross-section of said reinforcement member 120 has preferably a relatively large height/width-ratio for providing a high radial strength. A height/width ratio of 2:1 means that the height is twice of the width of the reinforcement member as seen in said cross-section. With increased height/width ratio, increased radial strength is provided. Small notches 140 are also shown distributed around the circumference of the first bearing seat 123. These notches 140 result from the casting of the gearbox housing 102, where a fixture holds the reinforcement member 20 at these distributed locations, thus preventing light metal material from reaching and covering these portions. After completed casting, the fixture is removed and the uncovered areas of the reinforcement member 120, i.e. notches 140, remain. The reinforcement member 120 is preferably substantially arranged within a radial plane defined by said first bearing seat 123. In case the reinforcement member 120 is arranged to enclose two bearing seats, then the reinforcement member 120 will be substantially arranged within a radial plane defined by said first and/or second bearing seat 123, 126.

Figure 7:
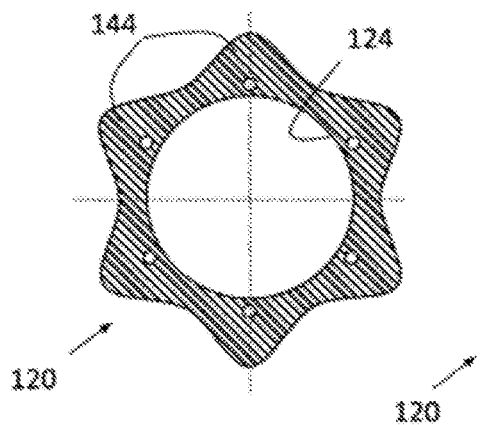
FIG. 7 shows an alternative design of a reinforcement member according to the first embodiment of to the invention.
Figure 8:
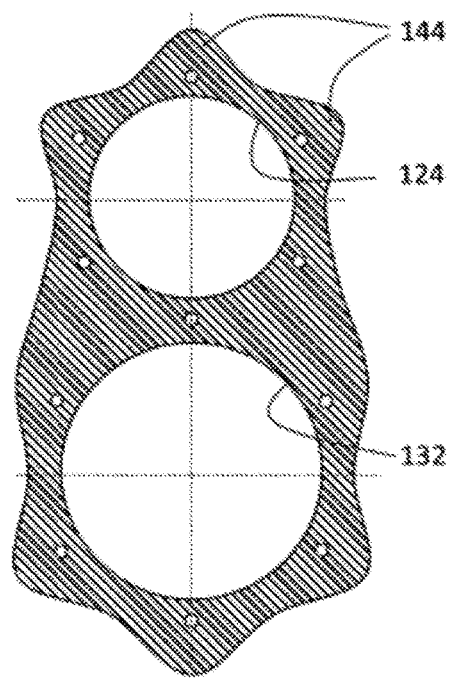
FIG. 8 shows an alternative design of a reinforcement member according to the second embodiment of to the invention.

FIG. 7 shows an alternative design of the reinforcement member 120 of the first embodiment. Here, the reinforcement member 120 is provided with circumferentially distributed projections 144 for further improved cast-in characteristics, such as the metallurgical bonding of the steel reinforcement member 120 to the light metal material of the housing 102. FIG. 8 shows a similar alternative design of the reinforcement member 120 of the second embodiment, where the projections 144 are distributed around the radial periphery of the reinforcement member 120. Moreover, the reinforcement member 120 of FIG. 8 also exhibits first and second cylindrical inner surfaces 124, 132 having different diameters. This configuration is suitable when the housing comprises bearings seats 123, 126 of different sizes, whereby the reinforcement member 120 is configured to correspond to the specific design of the housing 102.

A method of manufacturing the inventive multi-ratio gearbox housing for a vehicle is also disclosed. The method comprises the steps of providing a casting mould for said housing 102. The mould has means for providing bearings seats 123, 126 having cylindrical inner surfaces within the finished housing. Prior to feeding the light metal material into the mould, the reinforcement member 120 or members 120 are arranged within the mould. This may be performed by using a special reinforcement member fixture that holds the reinforcement member 120 at the desired position within the mould, such that the reinforcement member 120 becomes completely cast-in within the light metal material, possibly except for small notches 140 where the reinforcement member 120 was fastened during the casting process. After complete casting a first cylindrical inner surface 124 of the reinforcement member 120 surrounds the first bearing seat 123, thereby resulting in reduced thermal radial expansion of said first bearing seat 123 upon use of the gearbox housing in a vehicle. This technical effect is partly caused by the fact that the reinforcement member 120 is made of a material having lower coefficient of thermal expansion than the coefficient of thermal expansion of the light metal material of said housing 102. By further providing a constant radial distance 130 between said first cylindrical inner surface 124 of said reinforcement member 120 and said cylindrical inner surface of said first bearing seat 123 along circumferential lines of said first bearing seat 123, an improved thermal form stability of said cylindrical inner surface of said first bearing seat 123 is facilitated.

Furthermore, by providing an annular portion 122 of light metal material between the first bearing seat 123 and the inner surface of the reinforcement member 120, the first bearing seat 123 may be more easily machined to a small extent without machining the insert. This is advantageous because the light metal material of the housing 102, for example an aluminium-alloy, is often more easily machined than the reinforcement member material, which may be steel.

The invention has shown embodiments where a single piece reinforcement member surrounds a single bearing seat, and where a single piece reinforcement member surrounds two separate bearing seats. The invention is however not limited to these two configurations, but is equally applicable where a single reinforcement member surrounds three or more bearing seats in a wall of the housing.

As will be realised, the invention is capable of modification in various obvious respects, all without departing from the scope of the appended claims.

Accordingly, the drawings and the description thereto are to be regarded as illustrative in nature, and not restrictive.

The invention claimed is:

1. A multi-ratio gearbox housing for a vehicle, comprising:
a housing, the housing being made of light metal material,
a first bearing seat having a cylindrical inner surface,
a reinforcement member having a first cylindrical inner surface surrounding the first bearing seat for reducing thermal radial expansion of the first bearing seat, wherein the reinforcement member being of a material the coefficient of thermal expansion of which is less than the coefficient of thermal expansion of the light metal material of the housing,
the reinforcing member being a cast-in insert arranged in the housing, wherein a radial distance between the first cylindrical inner surface and the cylindrical inner surface of the first bearing seat is substantially constant along circumferential lines of the first bearing seat,
wherein the housing comprises a first wall that extends substantially perpendicular to a first axis of the first bearing seat, wherein the first bearing seat is arranged in the first wall, and wherein the reinforcing member is cast-in into the first wall of the housing, wherein a cross-section of the reinforcement member in at least one of an axial plane of the first cylindrical inner surface has a height/width-ratio of at least 2:1, wherein the reinforcement member is substantially completely embedded within the first wall, and wherein a height/width ratio of a straight wall portion of the first wall in which the reinforcement member is embedded and radially outside of the reinforcement member is at least 2:1.

2. The housing according to claim 1, wherein the housing comprises also a second bearing seat having a cylindrical inner surface, a first axis of the first bearing seat being parallel with a second axis of the second bearing seat, the reinforcement member having also a second cylindrical inner surface surrounding the second bearing seat for reducing thermal radial expansion of the second bearing seat, and for improving an interrelating dimensional stability of the first and second bearing seats, a radial distance between the second cylindrical inner surface and the cylindrical inner surface of the second bearing seat is constant along circumferential lines of the second bearing seat, facilitating improved form stability of the cylindrical inner surface of the second bearing seat over the temperature operating range of the housing.

3. The housing according to claim 2, wherein the second bearing seat is arranged in the first wall.

4. The housing according to claim 2, wherein the radial distance of at least one of between the first cylindrical inner surface and the cylindrical inner surface of the first bearing seat and between the second cylindrical inner surface and the cylindrical inner surface of the second bearing seat being within the range of 0.5 mm-50 mm.

5. The housing according to claim 2, wherein a cross-section of the reinforcement member in an axial plane of the first cylindrical inner surface and the second cylindrical inner surface has a height/width-ratio of at least 2:1.

6. Multi-ratio gearbox comprising a housing according to claim 2, wherein the gearbox comprising at least a first shaft and a second shaft with substantially fixed and substantially parallel axes, the first wall extending substantially perpendicular to the axes of the first shaft and the second shaft, and a plurality of gearwheels that are rotationally fixed to the shafts, the shafts comprising at least one output shaft and at least one countershaft, the shafts being suspended by bearings that are seated in the first and second bearing seats.

7. The housing according to claim 2, wherein the cylindrical inner surface of the reinforcement member completely surrounds the first bearing seat.

8. The housing according to claim 7, wherein the reinforcement member has a second cylindrical inner surface that completely surrounds the second bearing seat.

9. The housing according to claim 2, wherein the cylindrical inner surface of the reinforcement member completely surrounds the second bearing seat.

10. The housing according to claim 1, wherein the light metal material is aluminium-based light alloy, or magnesium-based light alloy, or titanium-based light alloy, and wherein the reinforcement member is made of steel or cast iron.

11. The housing according to claim 1, wherein the reinforcement member completely surrounds the first bearing seat.

12. The housing according to claim 1, wherein the reinforcement member is not machined after being cast-in in the first wall.

13. The housing according to claim 1, wherein the reinforcement member is made in a single piece.

* * * * *